United States Patent [19]

Thomas

[11] Patent Number: 4,849,741

[45] Date of Patent: Jul. 18, 1989

[54] TOOL BREAK DETECTING METHOD AND SYSTEM PREVENTING FALSE ALARMS DUE TO ROUGH SURFACES

[75] Inventor: Charles E. Thomas, Scotia, N.Y.

[73] Assignee: General Electric Company, Schenectady, N.Y.

[21] Appl. No.: 143,901

[22] Filed: Jan. 13, 1988

[51] Int. Cl.⁴ ............................................. G08B 21/00
[52] U.S. Cl. ...................................... 340/683; 73/104; 73/660; 340/680
[58] Field of Search .................. 340/680, 683; 73/660, 73/104

[56] References Cited

U.S. PATENT DOCUMENTS

| | | | |
|---|---|---|---|
| 4,636,779 | 1/1987 | Thomas et al. | 340/680 |
| 4,636,780 | 1/1987 | Thomas et al. | 340/680 |
| 4,642,617 | 2/1987 | Thomas et al. | 340/680 |
| 4,656,868 | 4/1987 | Azuma et al. | 73/587 |
| 4,707,687 | 11/1987 | Thomas et al. | 340/680 |

OTHER PUBLICATIONS

Hayashi et al., "Automatic Tool Touch and Breakage Detection in Turning", *General Electric Company, Technical Information Series*, No. 85 CRD 097, pp. 1–11 (Jun. 1985).

*Primary Examiner*—Glen R. Swann, III
*Attorney, Agent, or Firm*—Donald R. Campbell; James C. Davis, Jr.; Paul R. Webb, II

[57] ABSTRACT

Substantial cutting condition changes which occur in intermittent bursts as rough surfaced workpieces are turned generate specific vibration signal signatures known as the runout condition. Either an upper or a lower threshold is set and all mean signal samples are compared with the threshold value. When the mean cutting noise exceeds the upper threshold or stays below the lower threshold for a preset number of signal samples, a tool break alarm is generated. Techniques are given to reduce false alarms on runout during initial rough surface cuts. The system comprises an accelerometer or other sensor whose signal is processed to attenuate lower frequency machinery noise and to detect the signal energy in a band below 100 kHz, then sampled, and the digitized signal samples analyzed by pattern recognition logic.

25 Claims, 5 Drawing Sheets

SUSPICION CONFIRM

PROCESSED VIBRATION SIGNAL

UPPER LIMIT
LOWER LIMIT
S D S D
RUNOUT VIBRATION
SIGNATURE REJECTION

FIG. 3

UPPER LIMIT
LOWER LIMIT
S D
RUNOUT VIBRATION
SIGNATURE REJECTION

FIG. 4

LOWER LIMIT
SUSPICION DISMISS

FIG. 8

UPPER LIMIT
LOWER LIMIT
SUSPICION CONFIRM

TOOL BREAK DETECTING METHOD AND SYSTEM PREVENTING FALSE ALARMS DUE TO ROUGH SURFACES

Commonly assigned U.S. Pat. No. 4,707,687 and copending and commonly assigned patent application Ser. No. 142,979 are related to the present application.

BACKGROUND OF THE INVENTION

This invention relates to a system and method for acoustically detecting cutting tool breakage and rejecting background noise spikes that could cause false alarms, and more particularly, it relates to a circuit device and program logic which is able to differentiate between tool breakage and noise spikes caused by intermittent contact and non-contact resulting from machining of rough surfaces so as to avoid false alarms.

A machine tool monitor to detect broken tools and for part probing is described in commonly assigned U.S. Pat. Nos. 4,636,779; 4,636,780 and 4,707,687. A single sensor such as an accelerometer is mounted on the machine tool in a location with good coupling to vibrations generated at the tool-workpiece interface. The system is programmed to recognize signal patterns resulting from tool breakage. These patterns are typically abrupt, having substantial increases or decreases in the cutting noise mean signal level that persist for a given confirmation period and are caused by sudden changes in cutting conditions resulting from critical geometry changes in the cutting edge. Another signal pattern is evidenced by a gradual decrease in the cutting noise signal level due to a series of small breaks or other gradually occurring breakage.

A lathe tool break detection system has been developed that consists of a high frequency accelerometer to convert metal-cutting operation vibrations to broadband electrical signals, analog signal processing circuitry to amplify a selected band of signal frequencies and detect the energy in that band, and digital time-domain pattern-recognition logic to detect tool break signatures and reject normal cutting operation artifacts in the processed vibration signal. Pattern recognition logic detects tool break events occurring while machining the workpieces. This known tool break detection system has been successfully used for the detection of tool breaks in metal-cutting lathe operations in which the tools are various ceramic materials of round shape and the workpiece materials are tough aerospace alloys such as Inconel.

Tests with carbide tools cutting Inconel and other metals have shown the high frequency acoustic signal produced by a tool break event is often a dense high amplitude spiky noise. Moreover, both ceramic and carbide tools generate a great deal of spiky noise both at the beginning of a cut when the tool first makes contact with a workpiece and also during lathing operations, when the tool cuts a workpiece that has a rough surface so that the tool passes through air and workpiece material intermittently. This phenomenon is known as "runout condition", in which an initial cut on a rough surface causes the depth of cut to change abruptly one or more times per revolution of the part and the machine spindle. This situation can produce, under aggressive machining rates, very rapid increases and decreases in vibration signal level, including decreases to essentially zero level occurring when the tool passes completely out of the metal it is cutting.

Moreover, the vibrational frequency signatures generated by a runout condition and a tool break can be deceptively similar. Tool break signatures and runout noise bursts are not linearly separable on the basis of the amount, direction, or rate of the change of signal level produced. That is, for runout noise spike transients, the statistical spread of values for each of these measures alone, or in any combination, overlaps that of the corresponding measure for tool break signatures. Thus, a program logic is required which provides improved discrimination against runout vibration signal transient false alarms without adversely affecting the missed tool break detection rate realized by presently used program logic, and which is also usable with existing vibration based machine tool break detection systems, such as those described in U.S. Pat. Nos. 4,636,779, 4,636,780 and 4,642,617.

SUMMARY OF THE INVENTION

One object of the present invention is to provide an improved tool break detecting system and method for reliably detecting signature/background noise conditions that tend to be associated with lathing operations performed on workpieces having rough surfaces and displaying runout condition characteristics in the background noise.

Another object of the present invention is to provide an improved pattern-recognition method and system which readily and reliably detects and recognizes vibrational patterns indicative of tool breaks and differentiates between those signature patterns and the patterns which result from the runout condition.

A further object of the present invention is to integrate a tool break event detector in a system which is sensitive to a runout condition and which also incorporates other detectors such as an acoustic touch detector.

A still further object of the present invention is to provide an improved tool break detector that is less subject to false alarms resulting from runout conditions than existing tool break detectors presently used with cutting tools.

Another object of the invention is to provide a logic program which can reliably differentiate between tool break signatures and artifacts in normal cutting tool vibration signals including signals indicative of a runout condition so as to produce a sensitive detector of tool breaks with a low false alarm rate.

Still another object of the present invention is to provide an improved break event detection method and system which takes into account the repetitive nature, once or more per spindle revolution, of the runout noise spike transients so as to allow their differentiation from tool break signatures that make a longer-lasting change in vibration signal level.

Yet another object and a distinct advantage of the present invention is to provide a reliable method and system for the detection and recognition of a vibrational pattern associated with the tool break signature/background noise condition of cutting tools while avoiding the false detection of a tool break event due to runout conditions such as those caused by rough material surfaces of the workpiece being machined.

Another advantage of the method and system of the present invention is the ability to reliably differentiate between tool break signatures and artifacts in normal cutting tool vibration signals, especially those associated with runout conditions, and thus provide for a sensitive detector of tool breaks while maintaining the false alarm rate at a minimum.

A significant feature of the present invention is the program logic which allows the system to avoid mistaking the high-amplitude, short duration noise spikes encountered in the runout condition vibration signal for the abnormal cutting signal generated immediately after a break event occurs, while also detecting true tool break signatures through the confusion of noise spikes associated with runout conditions such as those caused by rough workpiece material surfaces being machined.

In accordance with these and other objects, advantages and features of the present invention, there is provided a machine tool monitor, a system and a method for detecting cutting tool break events even in a machine tool cutting rough workpiece material surfaces or other runout conditions associated with machining. The method of the present invention comprises the steps of sensing a vibrational energy signal by a vibration sensor, converting the sensed signal into an electrical analog signal, converting the electrical analog signal into digital form by an analog/digital converter, filtering unwanted low-level noise from the signal, and processing the digital signal through digital circuitry whereby the monitor and system operates in such a way as to detect the characteristic signature patterns of a true tool break while avoiding the triggering of a tool break alarm as a result of encountering and detecting the characteristics of a signature pattern associated with a runout condition such as that caused by the machining of rough workpiece material surfaces. The program logic according to the present invention uses a two-stage time-domain vibration signature analysis strategy in which any sudden large change in signal level is considered suspicious or is likely to be associated with a tool break event. The signal following each suspicion is then subjected to further tests before the suspicion is confirmed, by generating a tool break alarm, or dismissed, by returning to the task of looking for another suspicious signal transient. Hence, the tool break detector is designed to dismiss a suspicion if the signal level following it does not change, or does change but fails to remain changed for more than one spindle revolution period.

A system is disclosed and claimed in which a broadband vibration sensor, such as an accelerometer which is most sensitive to frequencies around a resonant frequency, typically 30 kHz and above, is positioned on the machine tool to sense vibrations at the tool-workpiece interface during the machining process. An analog preprocessor has a high-pass filter to attenuate low frequency machining noise, and a full wave energy detector to rectify and low-pass filter the signal. The 500 Hz or less cutoff frequency of the low-pass filter prevents aliasing from the subsequent sampling operation. The unipolar output signal of the analog preprocessor is sampled, and the samples converted to digital form and then analyzed by digital circuitry, which may be a programmable general purpose computer. The tool break detection lgic generates an alarm on major tool break events capable of damaging the workpiece, and prevents false alarms on minor tool break events that can be ignored and on transient spikes such as those caused by the machine tool's encountering a runout condition.

The program logic provides for calculating the running mean signal level of a selected number of signal samples. A transient detector compares every new sample with the running mean signal value of a number of previous samples to detect a transient or abrupt increase in signal level that may have its source in a major tool break event. If a suspicious transient signal is detected, the logic circuit then directs the program into the second level where the tool break event is either confirmed or denied.

In this part of the logic circuit, a mean shift detector compares the mean signal level after and before a transient signal has been detected in order to detect a shift in mean level and thus a substantial change in background cutting noise resulting from a true tool break. A shift check limit is set either above or below the mean level of the normal cutting signal calculated at the time that the transient has been detected, and subsequent running mean signals are compared to this limit and counted. A mean shift persistence detector checks that the number of mean signal levels counted, and thus the shift in mean signal level, persists for a given period, normally at least a long enough period to allow for one or more complete revolutions of the workpiece in, for example, a lathing operation.

A tool break alarm is generated only after a confirmation of a tool break which has met all of these tests. Detection of a suspicious transient signal not followed by a significant shift in the background noise level for at least a period including one workpiece revolution results in dismissal and return to the transient detect phase, and failure to meet the persistence check causes dismissal and return to transient detect. A tool break alarm is generated only when all the criteria are satisfied.

DETAILED DESCRIPTION OF THE INVENTION

Figure 1:
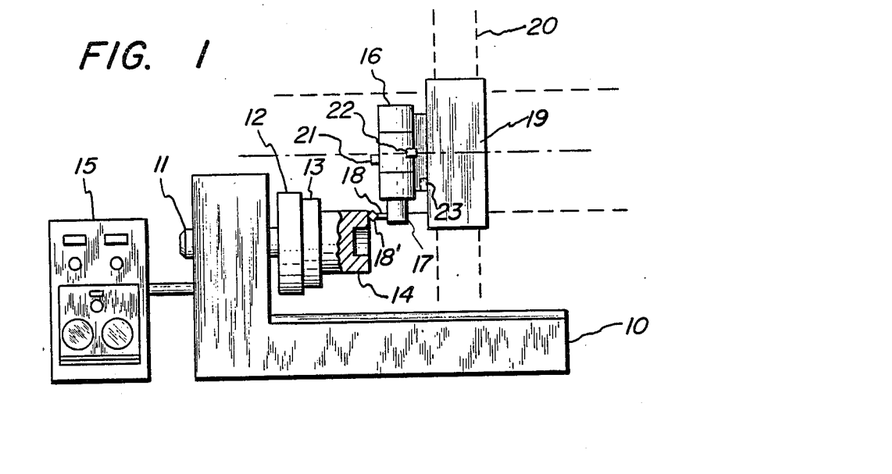
FIG. 1 is an elevational view of a horizontal turret lathe in partial cross-section showing the general configuration of a device according to the present invention.

FIG. 1 is a simplified drawing of a horizontal turret lathe which will be utilized to describe the invention, but it should be noted that the monitor of the present invention has applicability to other types of machine tools such as, for example, vertical turret lathes, milling machines, machining centers, and drills. The portion of the horizontal turret lathe illustrated has a machine frame 10, spindle shaft 11, chuck 12, fixture 13 for holding the workpiece 14, and an NC control station 15. A rotatable tool turret 16 has several tool posts 17 to support the cutting tool holders 18 and cutting tool inserts 18'.

The tool turret 16 is supported on a turret mount 19 which in turn has movement along the two cross slides 20. A vibration sensor 21, such as a broadband accelerometer, is mounted on turret 16; thus a single sensor in a single mounting position can monitor any tool holder position the operator selects for the cutting operation. This mounting location provides a satisfactory signal-to-spurious-noise ratio. Since the turret 16 can be rotated, and in many machines only in one direction, the sensor cannot be electrically connected to stationary signal processing electronics through simple cables. A rotating electrical coupler 22 is one way of transferring the electrical signal outputted by the transducer. Optionally, another vibration sensor 23 is mounted on one of the cross slides 20, where no rotating coupler is required and tests have shown that good operation is obtained on some lathes. Workpiece 14 rotates with spindle shaft 11 around a horizontal axis, and the cutting tool insert 18' is brought into contact with the workpiece 14 by the movement of the turret holder and mount assembly 16–19 along cross slides 20 toward the workpiece 14.

Automatic machine tools require some method of detecting tool break events. Manual monitoring of tools in the machining operations detracts from the advantages, such as decreased labor expenses, which derive from machine tool automation. Thus, an automatic machine tool monitor is desirable which will be able to detect all significant tool breaks while disregarding those characteristics of machine tool operation which resemble tool breaks, such as those associated with runout conditions, but that can still be differentiated by the use of precisely tailored program logic. One of the characteristics which may be used to make such differentiations is a monitor of the vibration pattern signatures generated at the tool-workpiece interface.

The break detector according to the present invention detects vibrations in the 30 to 100 EHz region and uses pattern recognition techniques to distinguish from the background noise the effects of tool break events. It makes use of both vibrational emissions produced by the rupture of the tool insert material, and changes in the cutting noise background that have their origin in changed cutting conditions resulting from the tool break event. Most other acoustic tool break detectors operate above 100 KHz and concentrate on detecting only the vibrational emission from the tool break event itself.

Machine tools break under a variety of different machining conditions and these tool break events produce a variety of different vibration signal signatures. Some of the machining conditions that affect the nature of the tool break vibration signature and spurious noise characteristics are the type and precise composition of the insert material, the shape of the insert and other geometry factors, methods of mounting the insert in the tool holder including material and geometry of the tool seat and use of a chip breaker, chatter, depth of cut, feed rate and spindle speed, roughness of the workpiece surface, including surface scale and previously machined holes, workpiece material, and cut discontinuities at the inside and outside corners. The machine tool monitor according to the present invention analyzes the vibration signal and separates those signal signatures caused by significant tool break events from those caused by either spurious noise sources such as those resulting from runout conditions or from insignificant tool break events. A description and analysis of the variety and types of tool breaks are fully explained in commonly assigned U.S. Pat. No. 4,636,78, issued to the inventor herein, the subject matter of which is hereby incorporated by reference.

Tool break detectors that monitor and interpret cutting noise for changes caused by tool break events can be confused by cutting noise perturbations produced on initial cuts on rough surfaces with a good tool. The system and program logic of the present invention prevent false alarms on such cuts while still permitting alarming on major tool break events that occur at any time, including during rough surfaces cuts.

Initial machining cuts on rough surfaces from prior casting or forging operations are characterized by abrupt changes in the depth of cut and include air-to-metal-to-air transitions. This, in turn, produces abrupt changes in cutting noise level including drops to traverse noise levels. False alarm prevention is needed because of this problem of signal level shifts that occur abruptly once or more per workpiece revolution due to "runout" in initial cuts on rough surfaces. Such abrupt transitions have many of the characteristics of valid tool break signatures. Disabling the tool break detector on rough cuts is not desirable because tool break events are more common under rough cutting conditions. Having a human monitor watch for tool breaks during rough surface cutting is not an attractive solution in many cases because some part programs involve rough surfaces cutting on most cuts and the efficiency gain in having an automatic machine tool is obviated by the necessity of a human operator presence.

One attempt at a solution of runout false alarms is described in aforementioned U.S. Pat. No. 4,636,780. In this patent, runout false alarms are prevented by adjusting the persistent mean shift confirmation period to be longer than a workpiece revolution period and rejecting signal level shifts that do not persist for at least one full revolution. The problem encountered by the device of U.S. Pat. No. 4,636,780 is best appreciated by a description of its operation. The logic program of the machine tool monitor operates as described below, and the basic operation and the elements of the present invention are similar, with the major difference being that the program logic of the present invention is able to overcome an inherent problem encountered with certain types of runout conditions.

The tool break detector disclosed by U.S. Pat. No. 4,636,780 makes a determination of an abrupt change in signal level of the vibrational emissions, the abrupt change being referred to as a signal transient or a "suspicion" of a tool break event. The program logic then transfers control to a second confirmation phase wherein the tool break detector monitors the vibrational emissions (for a preset period) to detect and confirm a substantial change in the mean signal level of the vibrational emission before and after the suspicion. The tool break detector makes the post-suspicion level change test by capturing and storing the mean signal level at the time of the suspicion, and then continuously comparing the current mean signal continuously computed by the detector with the stored mean value throughout the confirmation period. The criterion for comparison is whether there are N number of mean signals which have not shifted from the stored pre-suspicion mean. If N post-suspicion means fail to show sufficient mean level shift before the confirmation period times out, the suspicion is dismissed and the detector returns to looking for more suspicious signal transients. If fewer than N means fail to meet the level shift criterion before the confirmation period times out, a tool break alarm is generated.

Since the confirmation period is longer than a spindle revolution period, the runout noise burst that caused the suspicion and the subsequent signal level drop is sure to include another runout noise burst that will pull the mean signal level back up, thus causing the suspicion to be dismissed if the value selected for N is not too large.

Figure 2:
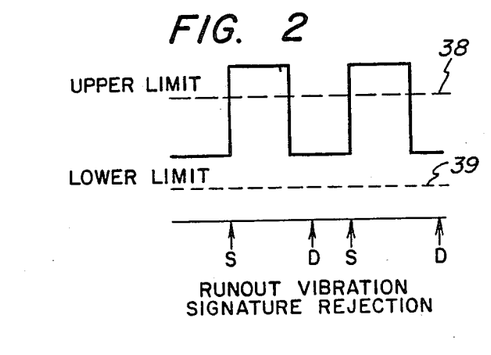
FIGS. 2-4 illustrate cyclically varying vibration signals produced by runout variation in depth of cut that are dismissed as false alarms.
Figure 3:
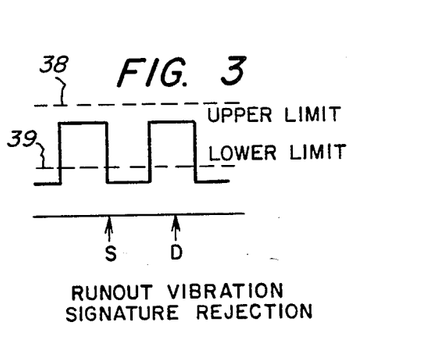
Figure 4:
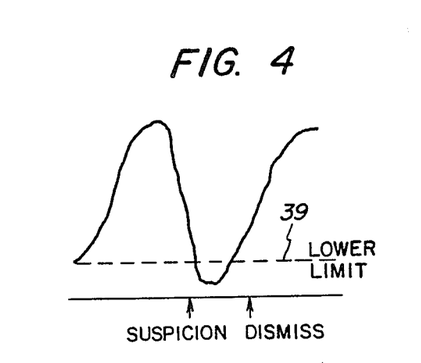

FIGS. 2-4 illustrate the types of signatures which can easily recognize a burst as being due to runout conditions. The tool break detector tests for mean level shifts both above and below the mean level at the time of the suspicion. Only means within a narrow band of levels near the stored mean level are considered to show insufficient level shift, and are counted in meeting the N unshifted means criterion for suspicion dismissal. The graphs show the mean signal amplitudes as a function of time.

Referring to FIG. 2, there is illustrated a runout condition which is detectable by the program logic of U.S. Pat. No. 4,636,780. The typical signature has a cyclically varying signal level such as might be produced by runout variation in depth of cuts. At point S, the abrupt increase triggers a "suspicion" check and holds the current mean signal as a reference. The vibration signal goes above the upper acceptable limit 38, but returns to the acceptable level between limits 38 and 39 before the confirmation period ends, so the "suspicion" is dismissed at D. Control is then returned to the transient detection phase of the program to search for another abrupt signal increase or decrease. This repeats each cycle because the confirmation period is a little longer than the spindle revolution period.

FIGS. 3 and 4 illustrate a result obtained if the initial "suspicion" occurs on the abrupt decrease in signal level encountered at the trailing edge of a burst. The vibration signal level goes below the lower amplitude acceptance limit but returns before the confirmation period ends. Because a sufficient number of mean signal levels fall between limits 38, 39, the trigger is dismissed at D. The system alarms on significant tool breakage because the abrupt change in signal level, whether up or down, persists for longer than the confirmation period.

Figure 5:
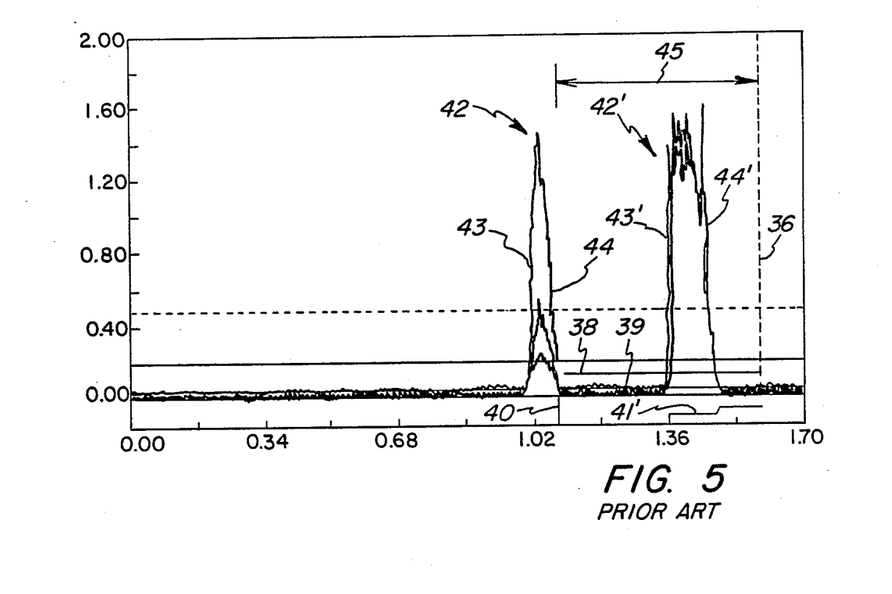
FIG. 5 illustrates a representation of a graph of vibration signals associated with a runout condition generating a false break alarm when logic of the prior art devices is used.

However, the tool break detector disclosed in U.S. Pat. No. 4,636,780 encounters significant detection problems in a runout condition signature when the suspicion is triggered by a downward sloping change in mean signal level, such as that illustrated by FIG. 5. For such a signature, the trailing edge 44 of runout burst 42 triggers a suspicion 40 and the runout noise burst amplitude changes become rapid. In FIG. 5, (also in FIG. 10) the mean signal amplitudes are plotted in the top portion of the graph, and the number N of samples meeting criteria are shown by line 41' in the lower portion of the graph. The post-suspicion mean signal level rises at the leading edge 43' of the next runout burst 42' and passes rapidly through the narrow band where the mean signal level is considered unshifted (between upper and lower limit checks 38 and 39) and then drops back through the narrow band at the trailing edge 44' without producing more than a few computed mean levels 41' that indicate to the detector the lack of a permanent level shift. The result is that the second runout burst 42', even though it occurs within the suspicion confirmation period 45, fails to dismiss the suspicion and a false alarm is generated at 36.

Program logic is required which provides for a compensating mechanism which takes into account rapidly changing vibration signal levels, such as those of edges 43, 44, 43', 44', since a simple expansion of the confirmation period 45 to encompass a complete spindle revolution is not sufficient to detect runout signatures of this type. The drop in mean signal level following the trailing edge 44' fails to count any further unshifted mean signal levels as shown at 41'.

Figure 6:
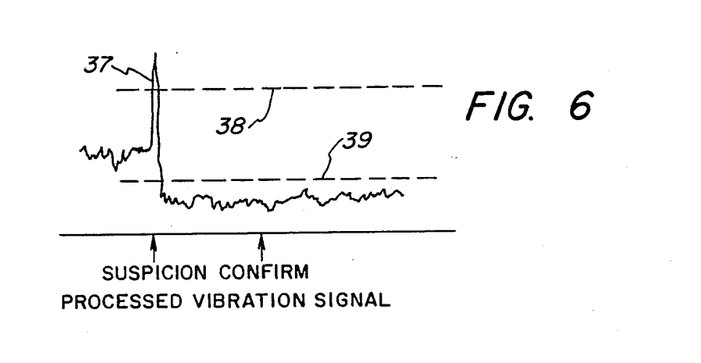
FIGS. 6-8 illustrate processed analog vibration signals which contain significant tool break signatures and which generate an alarm according to the present invention.
Figure 7:
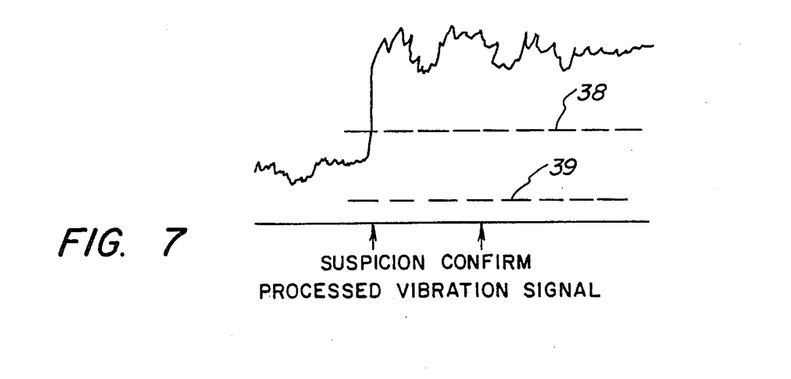

FIGS. 6 and 7 illustrate two other types of vibration signatures which tests have shown to be associated with significant tool break events, the analyzed signals being the filtered unipolar outputs of the analog signal channel. The tool break detection system generates an alarm on these and other vibration signal patterns that satisfy the criteria of both phases using either the program logic of U.S. Pat. No. 4,636,780 and, as will be shown below, using the program logic of the present invention.

The processed vibration signal shown in FIG. 6 has a short positive-going signal transient 37, sometimes called a noise spike 37, well above the previous mean signal level, followed by a sustained drop in mean signal level following the transient 37. The amplitude acceptance limits of the post-trigger signal are indicated by dashed lines 38, 39. The positive signal transient 37 may be the acoustic emission from the cracking insert or it may be due to a momentary jamming of a broken piece of insert against the workpiece. The sustained drop in mean signal is usually due to a substantial reduction in depth of cut after part of the insert breaks away. The positive-going transient 37 meets the "break suspicion" or transient detect criterion of the computer logic, and the sustained drop in mean signal level meets the "suspicion confirmed" or persistence test criterion.

The tool break vibration signature of FIG. 7 is characterized by an abrupt, sustained increase in mean signal level. The increase may be due to jamming of a broken piece of the insert between the remainder of the insert and the workpiece, or to cutting with a jagged edge of the insert. The cracking event vibration emission pulse is obscured by the high level of abnormal cutting noise. The probability of tool fracture signal detectability is lowest in the high cutting noise generally associated with high speed ceramic tool cutting of hard metals like Inconel. The abrupt rise in signal level meets the "break suspicion" or transient detection criterion, and the sustained high signal level meets the "suspicion confirmed" or persistence check criterion.

Figure 8:
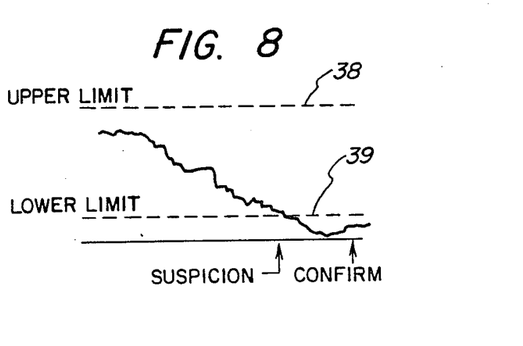

FIG. 8 shows another type of analog signature in which the vibration signal level declines fairly gradually so as to not trigger a suspicion transient until the sudden drop of signal level which triggers the mean signal shift persistence phase of the program logic, indicated as "suspicion". When the mean signal level persists below the lower limit 39 for a sufficient period, the alarm is generated. The parameters of the program logic, such as the necessary magnitude of transient change required to trigger a suspicion signal, may be varied depending on machining conditions. Also, the particular program logic according to the present invention may be utilized in conjunction with the program logic disclosed in other patents or copending applications, such as cutting tool wear detecting logic. Thus, the continual decrease of the signal level shown in the graph of FIG. 8 may also have triggered a tool wear detector signal due to another program working simultaneously before the triggering of a transient according to the logic of the present invention. Furthermore, a combination of programs may simultaneously monitor one particular cutting tool during a single machining operation and each program may be set to detect a particular set of characteristics, each of which would require a cutting tool replacement.

Program logic utilized in the aforementioned U.S. Pat. No. 4,636,780 detects normal runout signal signatures having well-defined characteristics such as those illustrated in FIGS. 2 and 3. However, a number of changes in the signature characteristics, or in the program logic parameters tend either to generate a greater rate of false alarms or to miss actual tool break events occurring in the machining process. For example, if the runout noise burst amplitude increases very suddenly, or if the upper and lower check limits 38, 39 are moved closer together, the peaks of the runout noise burst can go above the upper limit 38, so that the mean signal level remains between the two limits only during the rise and fall transients at the edges of the burst.

An actual instance of this situation is shown in FIG. 5, where the upper and lower limits 38, 39 are both much lower than the runout peak level because the initially stored or captured suspicion-time mean level was low. Since an insufficient number of mean signal levels between the two limits are accumulated during the rise and fall transients of the runout burst, as is illustrated by count graph line 41', the suspicion is not dismissed and a false alarm results at 36.

The graphs of FIG. 5 illustrate the operation of the program logic used in aforementioned U.S. Pat. No. 4,636,780. A suspicion is triggered on the trailing edge 44 of a runout burst 42. The operation of the program then shifts to the mean level shift persistence phase, and the logic searches for and counts the number of mean signal levels between the upper limit 38 and lower limit 39 preset by the logic program. The counting line is shown at 41' and increases only when the mean signal level is between limits 38, 39.

One method by which the logic presets the limits 38, 39 is as a percentage of the mean signal level at the suspicion trigger 40, and typically, the upper and the lower limits 38, 39 are respectively, two hundred percent and fifty percent of the mean signal level stored at the suspicion trigger 40. In the case of the graph in FIG. 5, because the suspicion was triggered on the trailing edge 44 of the runout burst 42, an abnormally high lower limit 39 is set because the mean signal has included the mean signal levels of the runout samples in its computation of limits. Thus, the mean signal samples computed between the runout bursts 42 and 42' are all too low and are not counted in graph line 41' as they fall outside limits 38 and 39. A few mean signal samples do fall between the limits at the leading edge 43' and the trailing edge 44' of the next runout burst 42', but these are too few to meet the criterion dismissing the suspicion as a runout condition, and a false alarm is generated at 36.

Figure 9A:
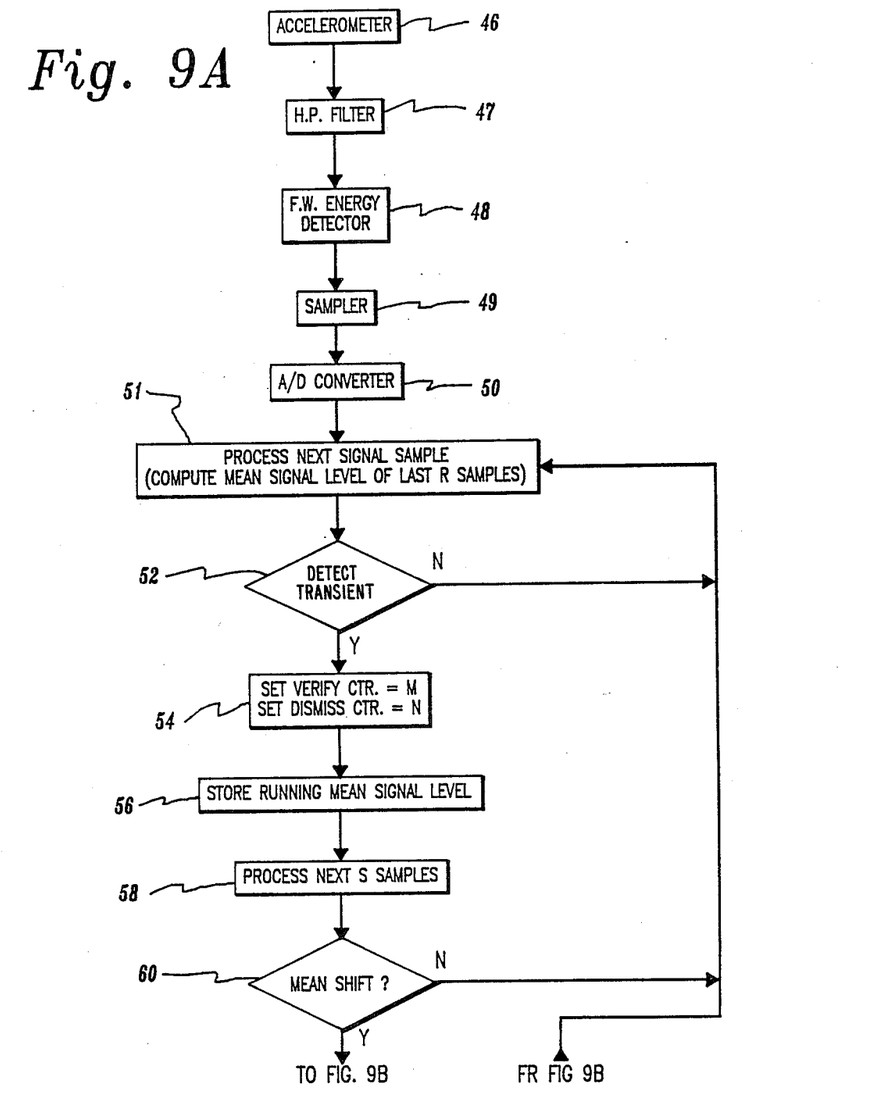
FIGS. 9A and 9B are a block diagram of the system and flow chart of the program logic utilized to detect significant tool break events according to the present invention.
Figure 9B:
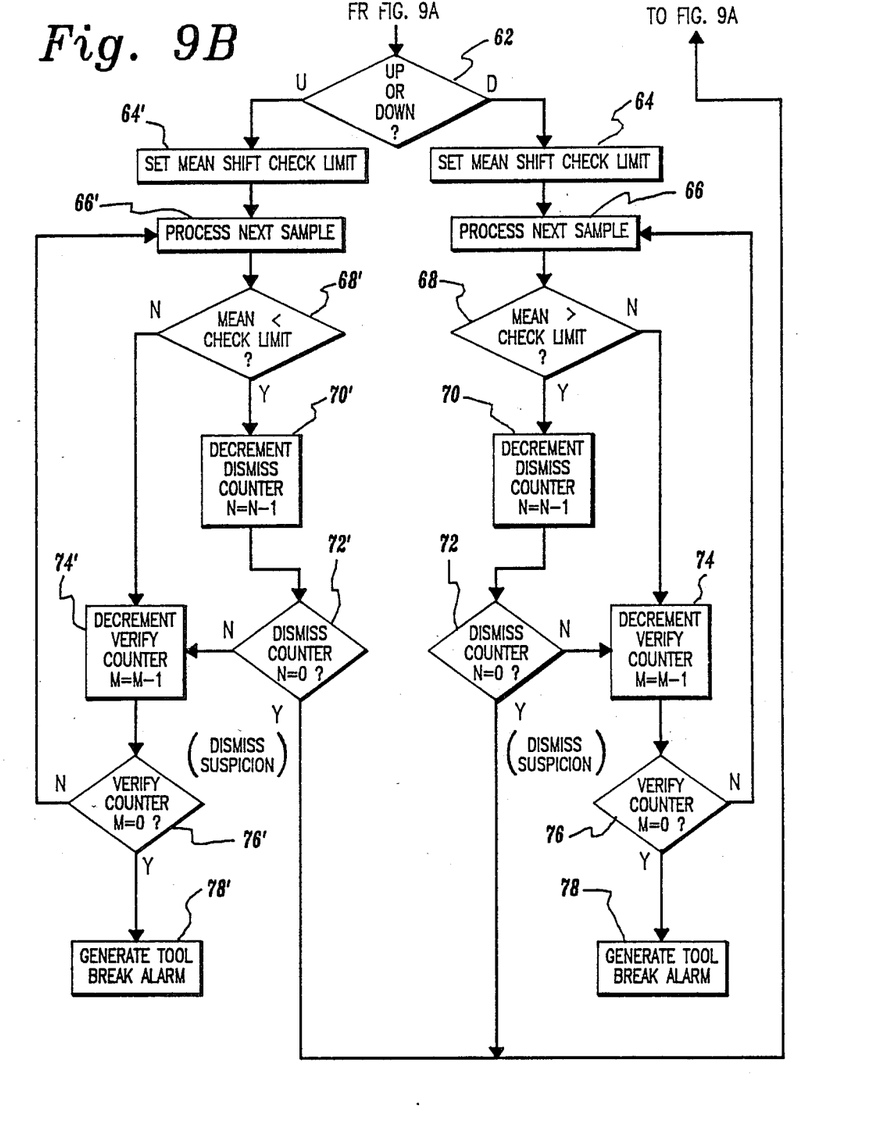

FIG. 9A and 9B is a representation of a block diagram and logic flow chart in accordance with the present invention employing logic to overcome the above-described problems according to the present invention and are now described. The sensor is a broadband accelerometer 46 with a flat response from very low frequencies to just below its resonant frequency in the vicinity of 30 kHz and above. This resonance is lightly damped, so the sensor is most sensitive to frequencies within a few kilohertz of its resonance, and sensitivity falls rapidly for frequencies much above the resonant frequency. One such high frequency vibration sensor is the Vibrametrics VM1018 accelerometer (VibraMetrics Inc., Hamden, Conn.)

The vibration signal is filtered in a high-pass filter 47 having a cutoff frequency slightly below the resonant frequency of the sensor to discriminate against and attenuate high amplitude machinery noise, which tends to be concentrated at lower frequencies. The combination of the resonant accelerometer 46 and the high-pass filter 47 produces a bandpass filter which filters the vibration signals and favors frequencies in about a 20 kHz band in the vicinity of the accelerometer resonance frequency.

A full wave rectifier and low-pass filter combination acts as a full wave energy detector 48 (the filtering is too heavy for true envelope detection), converting the bipolar sensor signal to a unipolar "envelope" signal. The cutoff frequency of the low-pass filter provides anti-aliasing filtering and is typically 500 Hz or less to prevent aliasing from the subsequent sampling operation as long as the sampling frequency is well above the 1 kHz Nyquist frequency. Thus, the sampling period can be long enough to accomplish the necessary digital analysis of the signal between analog signal samples. The cutoff frequency of the low-pass filter in fact may be as low as 100 Hz.

The signal samples of the output of the analog signal processing, extracted by sampler 49, are next converted to digital form by the analog-to-digital converter 50 and are further processed and analyzed by digital circuitry 51–78 which may be in the form of a programmable general purpose computer or microprocessor.

The digital circuitry first processes each digital signal sample, at block 51, by performing a running mean signal computation of the last R number of signal samples, R being about 16, and comparing the signal sample with the running mean signal value, block 52. If the signal sample has a value which is a predetermined amount above or below the running mean value, then the circuitry recognizes that as a transient and triggers the suspicion verification phase of the circuitry, represented by blocks 54–78 which identify the instructions and steps of the program logic.

At block 54 values for the verify counter and the dismiss counter are set. The values M and N respectively are chosen in accordance with established parameters depending on machining conditions, but a standard value for M would be a few samples above the number which would correspond to a complete spindle revolution at the lowest spindle speed used during a certain operation. If spindle speed is approximately 20 revolutions per second, and the sample rate is about 2000 samples per second, one revolution would require about 100 samples and M may be approximately 120. The number N can be a percentage of the number M, so that a certain percentage of mean signal values which do not meet the criterion established later in the program logic would be indicative of the absence of a sustained mean shift corresponding to a tool break and thus would dismiss the suspicion without generating an alarm. Block 56 stores the running mean signal at the moment which block 52 has detected a suspicion, and retains that value in a memory storage means in the program.

After the suspicion has been detected, the logic further processes the next S samples, block 58, where S is a sufficient number to determine conclusively whether a mean shift has occurred. If a mean level shift of sufficient magnitude has not been registered, the program logic reverts to the transient suspicion detection phase, blocks 51 and 52, as before. However, block 60 if a significant mean level shift has registered, the logic program proceeds to determine the direction of mean level shift, whether it is up or down, block 62. Depending on the direction of shift, the logic proceeds to one of two separate logic phases, 64–78 or 64'–8', which are identical to each other except for the direction of the check limit.

The down program logic 64–78 sets a mean shift check limit at or lower than the mean level at the time of the suspicion previously stored at block 56. Conversely, program logic 64'–78' sets a mean shift check limit at or above the stored mean level. No other difference exists in these two parts of the program logic, and so the following discussion will be limited to the portion where the direction of mean shift is down, but it should be understood that the logic for the upward mean shift is completely analogous.

As described above, the direction of mean level shift is registered, block 62, and if the shift is down, the program logic directs further processing toward the check limit, block 64, where a lower mean check limit is set at or below the mean level at the time of the suspicion detection previously stored, block 56. This is a significant difference from the logic of previously known programs which set both an upper and a lower check limit in the verification phase, such as U.S. Pat. No. 4,636,780. Because the logic of the present invention sets only one check limit, a number of problems resulting from runout noise bursts are advantageously avoided. Thus, if the initial mean shift was determined to have been down, the program logic will only register downward shifting mean signals as abnormal in its determination of a broken tool. As each sample is processed, block 66, the new mean signal is compared against the check limit, block 68, and if the new mean signal value is greater than the lower limit, then the dismiss counter value is decremented, block 70. This means that all mean signal values, including those in a runout burst, would register as normal, and the dismiss counter will continue decrementing and reach zero, block 72, thus dismissing a false alarm resulting from a runout condition.

Figure 10:
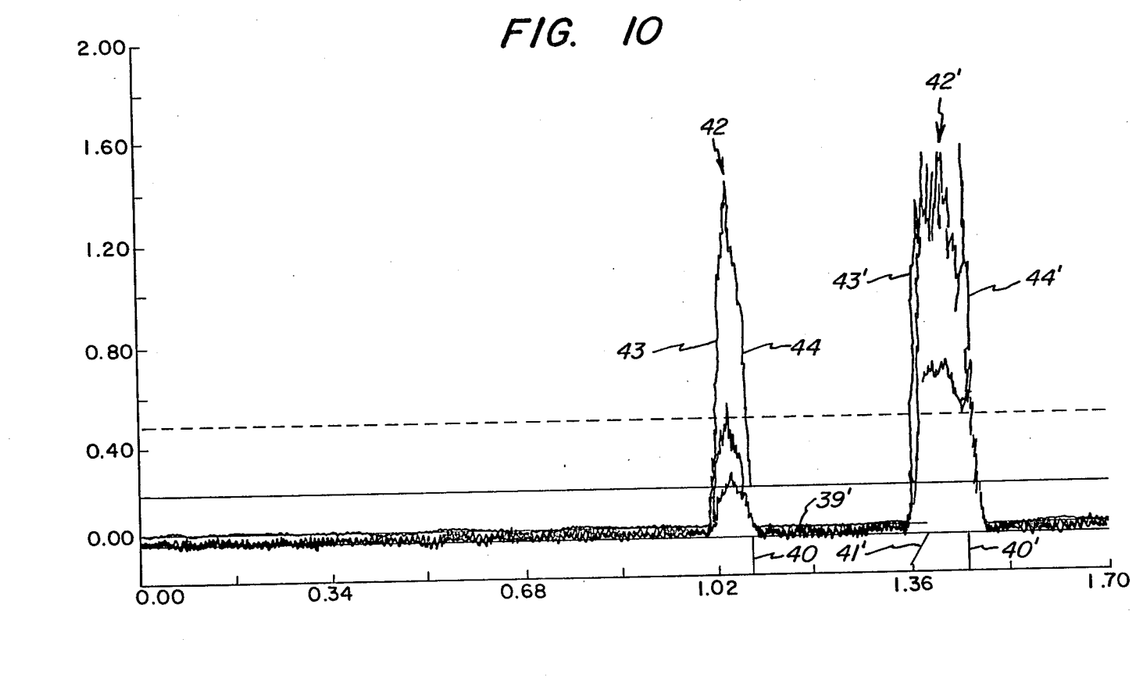
FIG. 10 illustrates a representation of the identical graph of vibration signals of FIG. 5, but wherein the program logic of the present invention is used to dismiss the suspicion generated as a false alarm.

Taking the identical graph of FIG. 5 as an example, the generation of a false alarm was described above when the previously known program logic was used. The program logic according to the present invention would dismiss such a false alarm, as is shown in FIG. 10 and as will be described below.

Both programs would work in the same way through point 40 in the graph where the transient suspicion is detected, i.e., at the trailing edge 44 of the runout noise burst 42. All runout transients must be allowed to produce suspicions, since the detector cannot reliably separate runout transients from tool break signatures without applying the additional suspicion confirmation tests, 60–76 of FIG. 9. Here, the difference between the program of the present invention and that of U.S. Pat. No. 4,636,780 again becomes apparent. Instead of establishing a criterion of normal signal values between two limits, e.g. 38 and 39, the program logic of the present invention establishes only a lower limit 39', because of the rapid downward shift in mean at 44, and all values above this limit 39' are considered normal.

The logic of both programs seeks to determine the number of normal values as a percentage of total values processed, as described above. However, the program logic of U.S. Pat. No. 4,363,780 would stop counting as normal those values which are in the leading edge 43' of the next runout noise burst 42' which are above upper limit 38, as shown in FIG. 5. As a result, not enough normal values are counted, and a false alarm is generated at 36 of FIG. 5.

In contradistinction, the program logic according to the present invention only sets one limit 39', and has no upper limit, since the initial mean shift would be determined as downward shifting by block 62 at the trailing edge 44 of runout noise burst 42. Thus, when a second noise burst 42' is detected, all values of the noise burst above limit 39' are registered as normal, as is shown by the count line 41', thus leading to a decrement of the dismiss counter by block 70. The dismiss counter will then have a sufficient number of dismiss counts to allow the dismiss counter to reach zero before the verify counter reaches zero, thus leading to a dismiss condition, and a return to the transient detect phase. A possibility exists that a suspicion will be triggered each time a runout noise burst is detected; e.g. 40, 40', but the program logic of the present invention is able to dismiss each as a false alarm, and will generate a tool break signal, block 78, only when a true tool break event has occurred.

The program logic according to the present invention will also generate a tool break alarm for other vibration signature patterns without unnecessarily false alarming. For example, FIGS. 5–7 show three distinct tool break signatures which are detectable by the program logic disclosed in U.S. Pat. No. 4,636,780, and are also detectable by the program logic according to the present invention. Using FIG. 6 as an example, the steps of the program logic will be utilized to show the generation of a tool break alarm.

The vibrational signature pattern of FIG. 6 is of the type having a noise spike 37 associated with a tool break followed by a sharp decrease in the mean signal level. Block 52 of the block diagram illustrated in FIG. 9 will detect the transient signal spike 37 and direct the program operation to the mean shift confirmation phase, blocks 54–60. The counters will be set, 54, and the running mean signal at the time the transient was detected will be stored, 56. Block 58 processes the next S samples, and block 60 will compare those samples against the stored running mean to detect a mean shift in the downward direction. The number of samples S would be set large enough so that the signal levels from the transient would not greatly influence the determination of the direction of shift by block 62, thus avoiding a continued upward shift in the mean level resulting from the noise spike.

As the mean shift level following the noise spike 37 is well below that before the noise spike, the check limit will be set at or below the mean signal level which has been stored by block 56. The check limit will be set at an appropriate position (not shown) and the program logic will then compute M number of samples, M being sufficiently large so that at least one complete revolution of the spindle has provided samples. Each sample signal will be compared against the check limit 39, by block 68, and those samples which are above the check limit will be considered normal and counted. Also, those which are lower than the check limit will be counted by block 74, until M number of samples lower than the check limit have been counted. Blocks 72 and 76 each compare the number of samples counted meeting their respective criteria, and the first one which reaches the previous number set by block 54 will generate either an alarm 78 or a dismiss suspicion signal, the Y path at 72. The program logic would be as efficient and effective in detecting tool breaks having other signature patterns, e.g. FIGS. 7 and 8, and in rejecting those caused by runout conditions, e.g. FIGS. 2-4.

Other aspects of the program logic provide added efficiency in detecting tool breaks while not false alarming because of noise bursts generated by runouts. In particular, the logic of the present invention computes and utilizes almost all of the mean signals detected during the runout noise burst and registers them as normal if the initial mean shift was determined to have been in the down direction, as the above-described example shows. With this approach, almost all means computed during the duration of the runout burst, not merely those occurring in a part of the rise and fall transients, are checked for evidence of the repetitive property of runout noise bursts. This allows setting N to a much higher value and greatly reduces the probability that a real tool break producing a long-duration mean signal level drop with occasional noise spikes, such as that shown in FIG. 8, wll be rejected by dismissal of the suspicion. It also avoids the need to set a relatively high threshold check limit to prevent suspicions low on the trailing edge of the signal transients from registering, and thus avoids missing a suspicion on some tool break transients. The result is an improved system and method which utilize more efficient program logic that distinguishes between an actual tool break and runout noise bursts.

While the invention has been particularly shown and described with reference to preferred embodiments thereof, it will be understood by those skilled in the art that various changes in form and detail may be made without departing from the true spirit and full scope of the invention.

What is claimed is:

1. A machine tool monitor for detecting cutting tool break events while machining a rough-surfaced workpiece, comprising:
    a vibration sensor means for generating an electrical analog signal representing vibration at an interface between the cutting tool and workpiece;
    processing means for processing said analog signal to develop a unipolar output signal; and
    means for sampling the unipolar output signal of said processing means and providing a sample output signal representative of the analog signal, and first means for comparing the sample output signal with the running mean signal level of a given number of previous samples to detect the presence of a transient that may be indicative of a tool break event, second means for comparing the running mean signal level after and before said transient to detect a shift in the running mean signal level indicative of a decrease or increase in background cutting noise, and third means for generating a tool break alarm when the shift in the running mean signal level persists for a preselected period;
    wherein said second means for comparing includes storage means for storing the value of said running mean signal level computed before said transient is detected, and said monitor further comprises:
    shift detecting means for detecting whether the running mean signal level after said transient is lower or higher than the running mean signal level before said transient.

2. The machine tool monitor according to claim 1 wherein the second means for comparing further includes means for setting a predetermined check limit for the mean signal level only in the direction of mean signal level shift detected by said shift detecting means;
    first decision means for comparing the running mean signal level to the check limit to determine whether a mean signal level check limit criterion has been met;
    counting means for counting only running mean signal levels which have not met said criterion; and
    second decision means for comparing the number of mean signal levels not meeting said criterion counted by said counting means to a preselected number N to detect the lack of persistence of said mean signal level shift.

3. The machine tool monitor according to claim 2 wherein said predetermined check limit is set at a preselected value which is related to said mean signal level stored by said storage means, said first decision means includes logic means to compare the mean signal level with said check limit and said counting means counts only if the mean signal level value fails to meet the mean shift criterion established by said first decision means comparison.

4. The machine tool monitor according to claim 2 wherein said counting means comprises a first decrementing means which decrements one unit from a preselected integer N each time said mean signal level value fails to meet the criterion established by said first decision means.

5. The machine tool monitor according to claim 4 wherein said third means for generating a tool break alarm includes a second decrementing means which decrements one unit from a preselected integer M each time a mean signal level value has been compared to said check limit so as to complete a sufficient number of comparisons corresponding to the expiration of said preselected period.

6. The machine tool monitor according to claim 5 wherein said third means generates a tool break alarm only when said second decrementing means reaches a value of zero before said first decrementing means reaches a value of zero.

7. The machine tool monitor according to claim 5 wherein said third means includes means to revert to said first transient detection means to detect the presence of another transient when said first decrementing means reaches value of zero before said second decrementing means reaches a value of zero.

8. The machine tool monitor according to claim 2 wherein said predetermined check limit is set at or less than said mean signal level stored by said storage means when the mean signal level after said transient is less than the mean signal level before said transient.

9. The machine tool monitor according to claim 2 wherein said predetermined check limit is set to a value at or greater than said mean signal level stored by said storage means when the mean signal level after said transient is greater than the mean signal level before said transient.

10. A system for detecting cutting tool break events while machining a workpiece having a rough surface comprising:

means adapted to be positioned on a machine tool to sense vibrations generated at the interface of the tool and workpiece and convert said vibrations to an electrical analog signal;

processing means for processing said electrical analog signal to discriminate against low frequency machine noise and to provide a unipolar output signal;

means for sampling said unipolar output signal of said processing means and converting each sample to digital form;

circuit means for monitoring the converted samples to detect tool break events, said circuit means including calculating means for calculating the running mean signal level of a preselected number of samples, a transient detector to compare each new sample with the running mean signal level and detect a transient having a sudden, large change in signal level that may have its source in a major tool break event, a mean signal level shift detector to compare the mean signal level after and before said transient detector has detected a transient so as to detect a shift and a direction of shift in the mean signal level indicative of a substantial decrease or increase in background cutting noise, and means for monitoring said mean signal level and generating a tool break alarm when said mean signal level shift persists for a given period.

11. The system according to claim 10 wherein said circuit means further includes storage means for storing the value of said running mean signal level at the time of said transient, limit setting means for setting a predetermined check limit for the mean signal shift only in the direction of the shift detected by said shift detector, first decision means for comparing each calculated mean signal level to determine whether a mean signal level check limit criterion has been met;

counting means for counting each mean signal level meeting said criterion, and second decision means for comparing the number of mean signal levels failing to meet said criterion with a preselected number N to detect the lack of persistence of said mean signal level shift.

12. The system according to claim 11 wherein said predetermined check limit is set at a preselected value which is related to the value of said mean signal level stored by said storage means, said first decision means includes logic means to compare the stored mean signal value with said check limit and said counting means counts only if the mean signal level value fails to meet the criterion established by said first decision means comparison.

13. The system according to claim 12 wherein said counting means comprises a decrementing means operatively connected to reduce the value of a preselected integer N by one integer unit each time said mean signal level value fails to meet said criterion established by said first decision means.

14. The system according to claim 13 wherein said circuit means further comprises a second decrementing means operatively connected to reduce the value of a preselected integer M by one integer unit each time a mean signal level value has been compared to said check limit whereby a sufficient number of comparisons is completed corresponding to the period of time greater than one spindle revolution.

15. The system according to claim 14 wherein said monitoring means causes a tool break alarm to be generated when said second decrementing means reaches a value of zero before said first-recited decrementing means reaches a value of zero.

16. The system according to claim 14 wherein said circuit means includes a dismiss circuit operatively connected to revert functioning to said transient detector to detect the presence of another transient when said first-recited decrementing means reaches a value of zero before said second decrementing means reaches a value of zero.

17. The system according to claim 11 wherein said predetermined mean signal level shift check limit is set in a range at or greater than said mean signal level stored by said storage means when the mean signal level after a transient is greater than the mean signal level stored by said storage means.

18. The system according to claim 11 wherein said predetermined check limit is set in a range at or less than said mean signal level stored by said storage means when the mean signal level after a transient is less than the mean signal level stored by said storage means.

19. A method of detecting breakage of a cutting tool operating on a workpiece having a rough surface comprising:

sensing vibrations of a cutting tool at an interface between the rough surface of the workpiece and the cutting tool during a machining operation;

converting said sensed vibrations to an electrical signal,     processing said electrical signal to discriminate against low frequency machine noise;

detecting the process signal to provide an output signal which has a transient indicative of a sudden, large shift in signal level;

sampling said output signal; and detecting said transient by comparing signal samples with the running means signal leve of a predetermined number of previous samples to determine whether a large shift in signal level indicative of a transient has occurred, comparing the mean signal level after and before said transient so as to detect a mean signal level shift and dismissing any transients not followed by a substantial shift in said means signal level indicative of a change in background cutting noise, checking that said mean signal level shift persists for a given period longer than at least one revolution period of the workpiece and dismissing any transients which are not followed by a mean signal level shift persisting for said given period, and generating a tool break alarm when both criteria are satisified;

wherein said detecting step further comprises storing the value of said running mean at the time that a transient has been detected, setting a predetermined mean signal level check limit only in the direction of the mean signal level shift detected in said step of comparing the mean signal level after and before the transient, generating a new mean signal value each time said output signal is sampled; and processing each new mean signal value by counting each mean signal value not having a level that meets a criterion related to said check limit, and identifying a condition wherein the nmber of mean signals not having levels meeting said criterion exceeds a first preselected number N whereby the lack of persistence of said mean signal level shift may be determined.

20. The method according to claim 19 wherein said counting and identifying steps further include setting said first preselected number N and decrementing said first number by one each time said mean signal level fails to meet said criterion related to said check limit.

21. The method according to claim 20 wherein said processing step further includes setting a second preselected number M, decrementing said second number by one each time said newly generated mean signal has been processed, whereby the number of new mean signals processed corresponds to the period of operating of the cutting tool and a sufficient number of said new mean signals processed corresponds to said given period longer than at least one spindle revolution period.

22. The method according to claim 21 wherein a tool break alarm is generated only when said second preselected number M has been decremented to zero before said first preselected number N has been decremented to zero.

23. The method according to claim 21 wherein the condition wherein said first number has been decremented to zero before said second number has been decremented to zero causes a dismissal mode and a reversion to the transient detecting step ensues.

24. The method according to claim 19 wherein said predetermined mean signal level check limit is set in a range at or greater than said stored running mean signal level when the mean signal level after said transient is greater than the mean signal level before said transient whereby said criterion is met and said mean signal is not counted when the mean signal level is less than said check limit.

25. The method according to claim 19 wherein said predetermined mean signal level check limit is set in a range at or less than said stored running mean signal level when the mean signal level after said transient is lower than the mean signal level before said transient and said criterion is met and said mean signal is not counted when the mean signal level is greater than said check limit.

* * * * *